April 4, 1961  C. A. DI MAGGIO ET AL  2,977,862
TAGGING APPARATUS
Filed May 20, 1958  8 Sheets-Sheet 1

INVENTORS
CARMELO A. DI MAGGIO
JAMES W. HEALY
RALPH M. LAMADE, JR.
BY
ATTORNEY

April 4, 1961

C. A. DI MAGGIO ET AL 2,977,862

TAGGING APPARATUS

Filed May 20, 1958

INVENTORS
CARMELO DI MAGGIO
JAMES W. HEALY
RALPH M. LAMADE, JR.

BY

ATTORNEY

April 4, 1961

C. A. DI MAGGIO ET AL 2,977,862

TAGGING APPARATUS

Filed May 20, 1958

INVENTORS
CARMELO A. DiMAGGIO
JAMES W. HEALY
RALPH M. LAMADE, JR.

BY

ATTORNEY

April 4, 1961 C. A. DI MAGGIO ET AL 2,977,862
TAGGING APPARATUS

Filed May 20, 1958 8 Sheets-Sheet 4

INVENTORS
CARMELO A. DI MAGGIO
JAMES W. HEALY
RALPH M. LAMADE, JR.
BY
ATTORNEY

April 4, 1961 C. A. DI MAGGIO ET AL 2,977,862
TAGGING APPARATUS
Filed May 20, 1958 8 Sheets-Sheet 6

INVENTORS
CARMELO A. DiMAGGIO
JAMES W. HEALY
RALPH M. LAMADE, JR.
BY
ATTORNEY

April 4, 1961　　　C. A. DI MAGGIO ET AL　　　2,977,862
TAGGING APPARATUS

Filed May 20, 1958　　　　　　　　　　　　　　　　8 Sheets-Sheet 7

INVENTORS
CARMELO A. DI MAGGIO
JAMES W. HEALY
RALPH M. LAMADE, JR.

BY
ATTORNEY

April 4, 1961

C. A. DI MAGGIO ET AL 2,977,862

TAGGING APPARATUS

Filed May 20, 1958

INVENTORS
CARMELO A. DI MAGGIO
JAMES W. HEALY
RALPH M. LAMADE, JR.
BY Bessie A. Lepper
ATTORNEY United States Patent Office
2,977,862
Patented Apr. 4, 1961

2,977,862
TAGGING APPARATUS

Carmelo A. Di Maggio, Waltham, James W. Healy, Wakefield, and Ralph M. Lamade, Jr., Wayland, Mass., assignors to Arthur D. Little, Inc., Cambridge, Mass., a corporation of Massachusetts Filed May 20, 1958, Ser. No. 736,571
9 Claims. (Cl. 93—87)

This invention relates to automatic equipment for attaching tags to items and more particularly to attaching non-adhesive, non-stapled tags which have displaceable tabs to items which are normally difficult to handle mechanically.

In the process of preparing items for the market, it is often necessary to place tags or labels thereon before the items are finally packaged. This is particularly true in the case of women's hose, an application to which tags or labels which have an adhesive backing or which require staples are not suitable because of the damage which such tags might do. Because of the nature of such tags, it has always previously been necessary to attach them manually, a process which is relatively slow and expensive.

An object of this invention is to provide an automatic apparatus for quickly and easily attaching non-adhesive, non-stapled tags with displaceable tabs to items including those which are difficult to handle, e.g., nylon hose.

Another object of this invention is to provide an apparatus for attaching tags which is simple in construction, and which also is strong and sturdy and reliable in operation at all times. A further object is to provide an automatic tag attaching device which is easily loaded with tags of various sizes and which has adjustment means providing for the use of tags of various lengths and their automatic alignment in the system. It is a further object to provide an autmotaic tag attaching device which makes allowance for varying positions within certain limits, of the item to which the tag is attached. These and other objects will become apparent in the following description.

The apparatus of this invention may be divided into six mechanisms according to the functions which they perform: tag-feeding, tag-advancing, tab-punching, tag-cutting, carriage which moves the tag to the item and attaches it, and platform which manipulates the item to be tagged into position. In the carriage mechanism there is included a sensing device for determining whether the item to be tagged is within the position limits and hence is in condition to receive a tag.

In general the apparatus of this invention suitable for automatically applying a tag having a displaceable tab to the edge of an item, comprises feeding means for supplying a string of the tags which are joined to each other, advancing means which incorporate a forward and return cycle for intermittently advancing the tags during the forward cycle, punching means for displacing the tab of the tag, cutting means for separating the leading tag from the string of tags as it advances through the apparatus, carriage means for moving the cut tag forward and platform means for positioning the item to be tagged into tagging relationship with said tag before it has been moved forward and is held in position on the carriage. The carriage means incorporates means for returning the displaced tab to its original position to engage the tag on the edge of the item and sensing means for determining the presence of the item within predetermined position limits on the platform. The punching, cutting and carriage means are so positioned and coordinated with relation to each other that they perform their functions concurrently on contiguous tags during the return cycle of the advancing means. The platform is likewise coordinated with the advancing means so that it brings the item into tagging position at the time the carriage means moves the tag forward.

The automatic tag attaching device of this invention may now be described fully with reference to the accompanying drawings in which.

In the following description of the apparatus, each of the six mechanisms will be described in detail. They are designated generally A through F in Figs. 3, 4 and 5, A representing the tag-feeding mechanism, B the tag-advancing mechanism, C the tab-punching mechanism, D the tag-cutting mechanism, E the carriage and F the platform. Following the detailed description of these mechanisms their operation and relationship with each other will be shown by describing the movement of a tag through the apparatus. The final attachment of such a tag to the hem of a pair of nylon stockings will be traced to illustrate how the apparatus functions.

Figure 1:
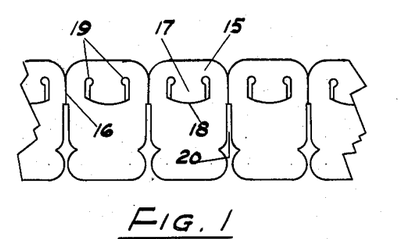
Fig. 1 is a plan view of a string of tags to be attached.
Figure 2:
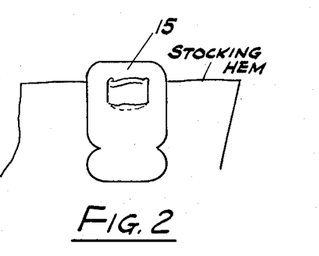
Fig. 2 is a plan view of a portion of the top of a pair of nylon hose to which one of the tags of Fig. 2 has been attached.
Figure 3:
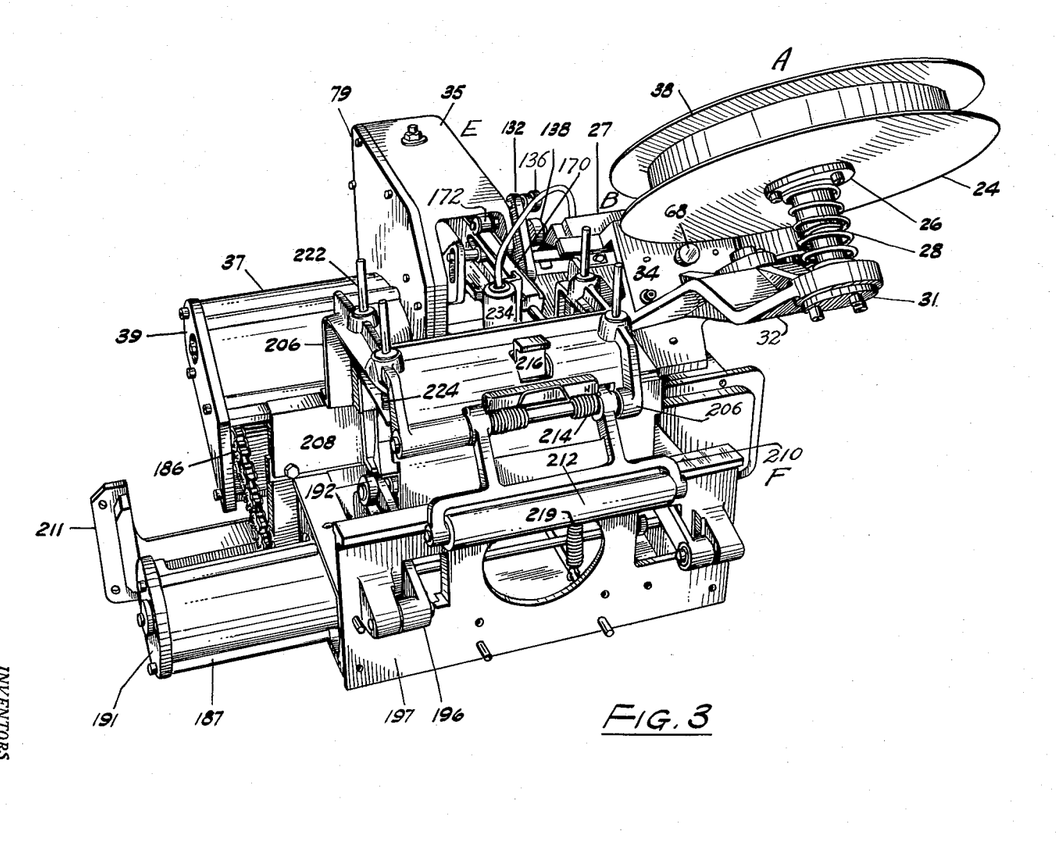
Fig. 3 is a perspective view of the apparatus looking down.
Figure 4:
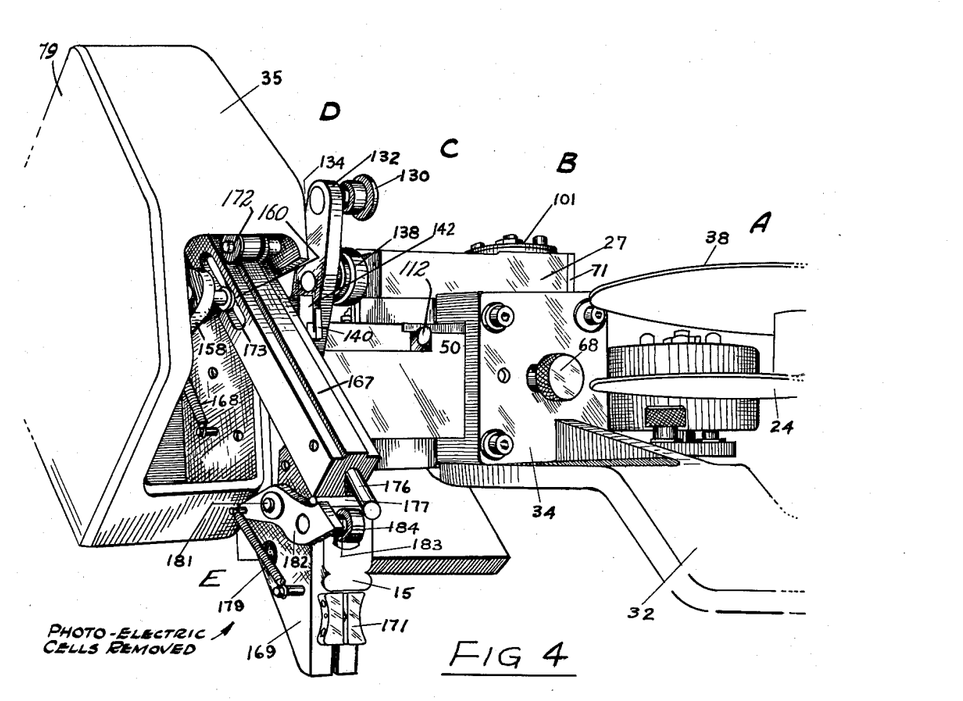
Fig. 4 is a top plan view of the apparatus showing the tag-feeding mechanism, the tab-punching mechanism and the carriage mechanism.
Figure 5:
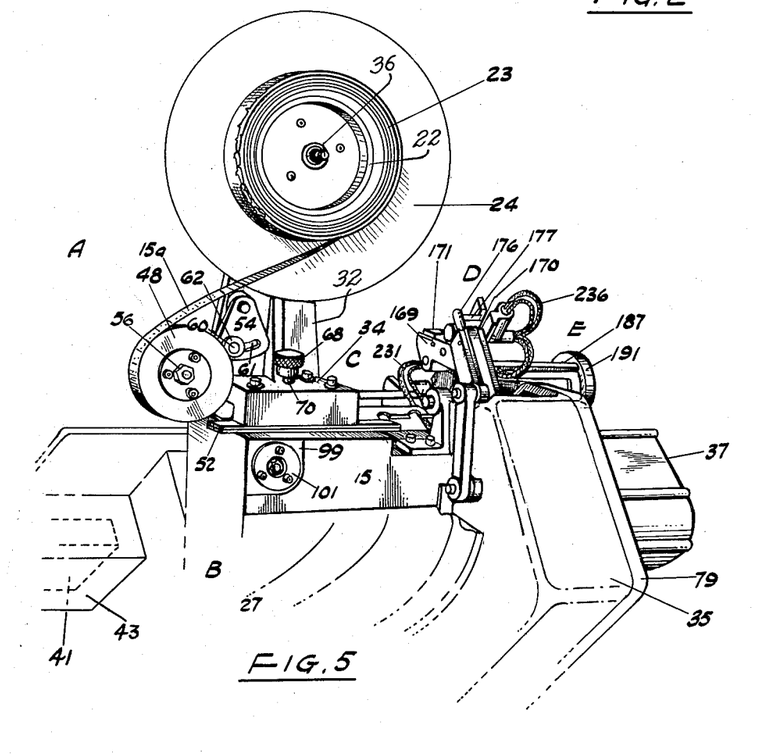
Fig. 5 is a side view of the apparatus of this invention showing the tag-feeding and tag-advancing mechanisms with some details of the carriage mechanism.

In the drawings Fig. 1 shows the general type of tag which is supplied in strings and which is handled by this apparatus, and Fig. 2 illustrates how the tab is finally placed on the item such as the hem of a pair of nylon hose. Figs. 3, 4 and 5 show perspective or plan views of the apparatus to illustrate it as an integral whole. Figs. 6 through 15 are detailed cross-sectional views of the various mechanisms while Fig. 16 illustrates the timings of the various cams with their relationship to each other, and particularly to the timing of the tag-advancing pawl.

Fig. 1 illustrates a string of typical tags which are suitable for use in the apparatus of this invention. Tags 15 such as illustrated in Fig. 1 are normally made from cardboard or heavy paper and are supplied in a string being connected through a portion of each of the sides, such as designated at joining 16. Each of the tags has a tab portion 17 which is precut at line 18 for bending the tab upwardly (or downwardly as the case may be) thus making it displaceable for insertion on the edge of the item to be tagged. Slots 19 are provided for easy insertion of the edge of the item and external slots 20, located between the tags in the string, serve as slots for engaging the ends of a pawl to drive the tags through the apparatus, much in the same manner as movie film is driven through a projector mechanism.

The apparatus of this invention is shown in three perspective views in Figs. 3, 4 and 5 with the six mechanisms labeled by letters as indicated above. In general, it will be seen that it consists of housing sections which may be designated as the forward housing 27, the central housing 35 with a removable plate 79, and an after housing 37 with a removable plate 39. In addition, a chain housing 187 with plate 191 is provided to house an auxiliary shaft and its drive chain. Suitable means for driving the mechanisms such as electric motor 41 in housing 43 are provided. The entire assembly is mounted on main mounting 211 and may be moved laterally on this main mounting 211 as indicated in Fig. 3. Thus the entire apparatus may be moved from the position shown to that determined by the left hand member of mounting 211. This lateral movement of the apparatus is desirable to give it flexibility, inasmuch as it permits the tagging apparatus to place the tag at the extreme sides of an item or at any position in between.

Tag-feeding mechanism

Figures 6, 7:
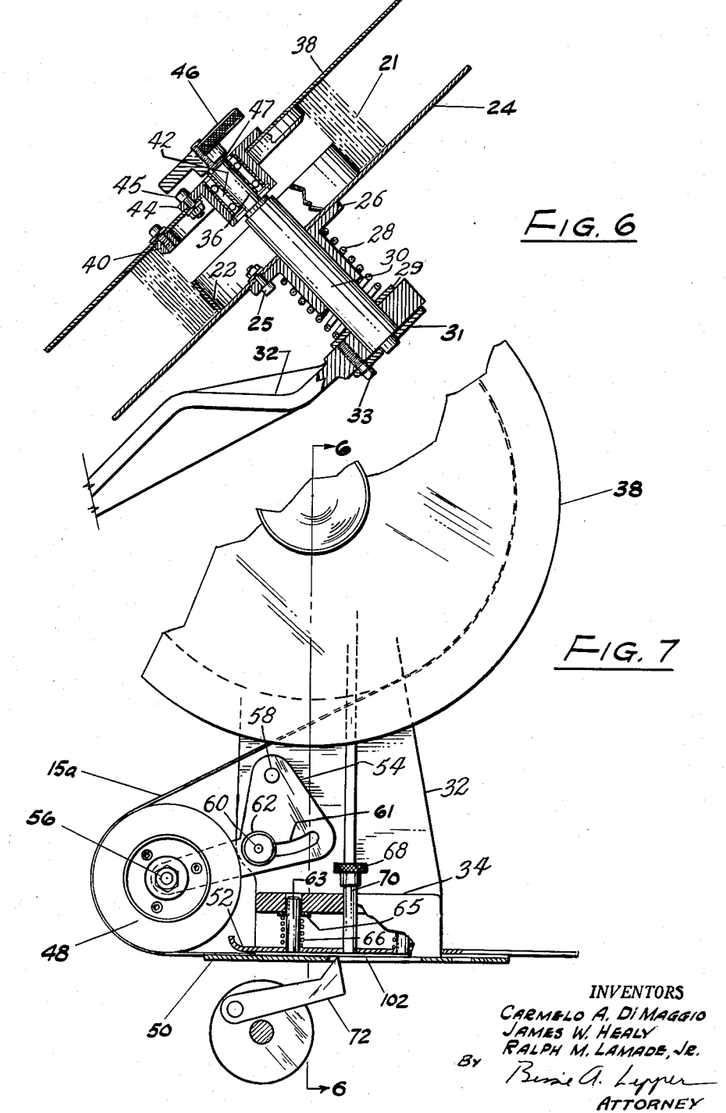
Fig. 6 is a cross-sectional view of the tag-feeding mechanism taken along lines 6—6 of Fig. 7.
Fig. 7 is a view, part in cross-section and part in plan, of the tag advancing mechanism.

The tag-feeding mechanism is shown in detail in Figs. 5, 6 and 7. A roll of the tags 23 to be used in this apparatus is placed in operational position by inserting it on roll guide 22 which is located within supply roll 23 and affixed to a movable flange 24 (Fig. 6). Flange 24 is movable in the sense that its collar 26 is affixed to flange 24 by means of bolt 25 and rides on the upper portion of an adjustment spring 28 to permit flange 24 to be adjusted in an up and down direction on support shaft 30, the adjustment allowing for tags of various lengths to be handled. Support shaft 30 is attached through collar 29 and plate 31 by suitable means such as screw 33 to supply support flange 32 which in turn is attached to or integral with housing 34.

Collar pin 36 extends from supply shaft 30 and at its terminal end is threaded. A fixed flange 38 having guide roll 40 and being furnished with a bearing system 42 (contained in a bearing cartridge 44 and retainer 47 affixed to flange 38 by means of bolt 45), is provided to slip down over collar pin 36 in a manner that guide roll 40 positions the tags in tag roll 23. Knob 46 screws on the terminal threaded end of collar pin 36 to fix flange 38 in a permanent position with respect to the apparatus, thus providing automatic alignment with the tags in the system, no matter what their lengths. In changing or reloading the tag roll 23 in the tag-feeding mechanism, the hand knob 46 is unscrewed and the fixed flange 38 removed for placement of the tag roll 23 onto guide roll 22.

The tickets are directed from the primary supply roll 23 to pass around idler roll 48 (Fig. 7) and in between lower platen 50 and upper platen 52, the latter being curved upwardly at the point of entry of tag string 15a. Idler roller 48 may be moved in and out of position for ease of locating the tags in the tag-feeding mechanism. This is done by means of adjusting bracket 54 which is affixed through support shaft 56 to idler roll 48 and to supply support frame 32 by means of pivot pin 58. Adjusting pin 60 which passes through slot 61 of adjustment bracket 54, and which is equipped with a locking thumb screw 62, permits moving the idler roll 48 in a general sidewardly direction and affixing it in the desired position after the tags are inserted in the system.

The tag-advancing mechanism

Tags are positioned in the tag-advancing mechanism (Figs. 7, 8 and 9) by raising upper platen 52, which is permanently affixed through post 70 to lifting knob 68. Spring 66 acting on a collar 65, attached to housing 34, maintains upper platen 52 in its normal down position. Once the first tag of string 15a has been advanced manually until the external slot 20 between the first two tags is engaged by driving pawl 72, the mechanical operation of the ticket advancing mechanism is ready to begin.

All of the mechanisms of the apparatus of this invention are driven by main cam shaft 74 (Fig. 8) which at the forward end is affixed to a gear driving pin 75 which is integral with main shaft 74 and positioned in forward casing cap 71 of housing 35 through bearing 73. The after end of main cam shaft 74 is mounted to central housing plate 79 of central housing 35 through pin 81, which is integral with main shaft 74, and bearing system 77. The forward end of main cam shaft 74 is integral with a drive mechanism 41 located in housing 43.

Figure 8:
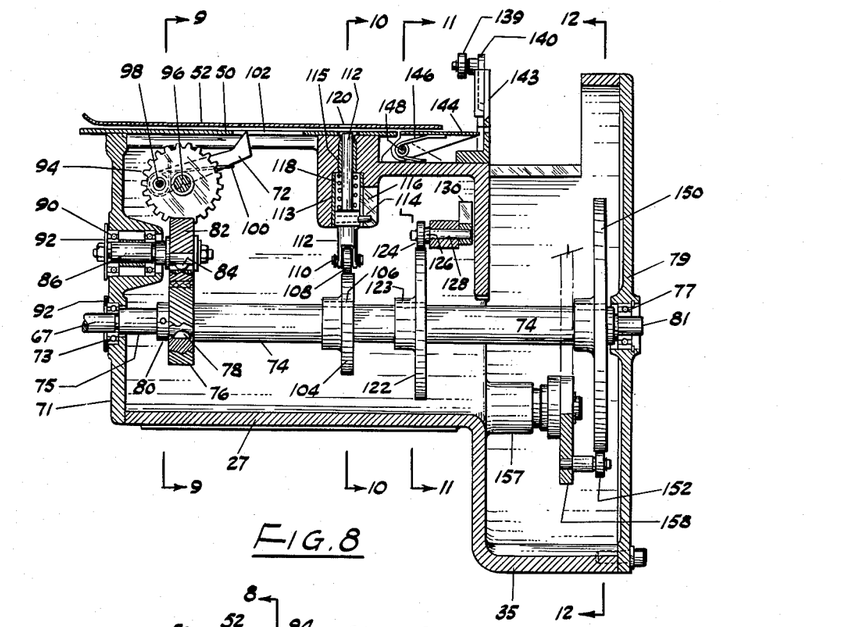
Fig. 8 is a cross-sectional view, taken along lines 8—8 of Figs. 9, 10 and 11, showing the driving cams for the tag-advancing, tab-punching, tag-cutting and carriage mechanism.
Figure 9:
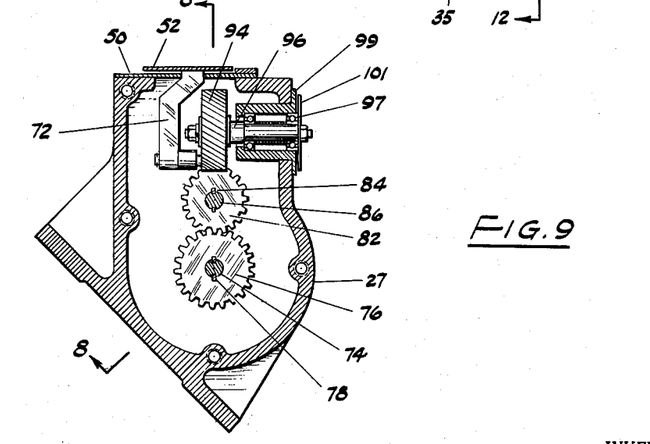
Fig. 9 is a cross-sectional view taken along line 9—9 of Fig. 8 illustrating the gear drive of the tag-advancing mechanism.

The tag advancing mechanism is driven by means of the gear system shown in Figs. 8 and 9. Right-hand helical gear 76 is affixed to main cam shaft 74 through key 78 and held by collar 80. This lower right-hand gear 76 drives left-hand helical gear 82, which in turn is affixed by means of keys 84 to shaft 86 which in turn rotates on bearings 90 held in retainer 92. Left-hand helical gear 82 engages and drives an upper left-hand helical gear 94 which is equal in size to right-hand helical gear 76. Upper left-hand helical gear 94 is mounted on gear shaft 96, bearing 97 in bearing housing 99 and plate 101 screwed to forward housing 27. Driving pawl 72 is attached to left-hand helical gear 94 by means of pivot 98 and spring 100 which is designed to load the pawl always in an upwardly direction and to position it to extend through slot 102 in lower platen 50 to engage the external slot 20 of a tag. Driving pawl 72 thus advances a distance somewhat greater than the distance between slots 20 on adjacent tag 15 during 180° revolution of helical gear 94 and is recovered or returned to its advancing position as helical gear 94 passes from 180 to 360° as indicated in the timing cycle A of Fig. 16. Thus the tag advancing mechanism has a forward and rearward motion, and as will be seen, all of the remaining mechanisms perform their functions during the rearward motion of the cycle.

Tab-punching mechanism

Figure 10:
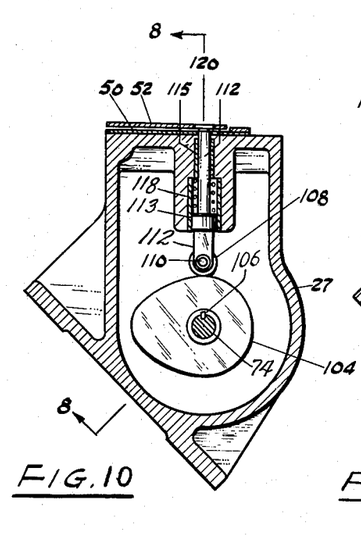
Fig. 10 is a cross-sectional view taken along line 10—10 of Fig. 8 showing the tab-punching mechanism.

The tab-punching mechanism is shown in detail in Figs. 8 and 10. In order to insert the edge of the item to be tagged into the tab, it is necessary to punch out tab 17 (see Fig. 2) in an upwardly direction. This is the purpose of the tab-punching mechanism.

Tab-punch cam 104 is affixed to main cam shaft 74 by means of key 106, while tab-punch cam follower 108 is affixed to tab punch 112 by means of support pin 110. Tab punch 112 is positioned in housing 116 by means of bushings 113 and 115 and held in a fixed position with relation to housing 116 by an anti-rotating pin 114. As shown in time cycle B of Fig. 16, the tab-punch is driven positively upward during the recovery cycle of the tab-advancing pawl, and is returned to its downward position by means of return spring 118 as a succeeding tag is forced into place during the advancing portion of the cycle of driving pawl 72. Slot 120 is provided for the projection of the tab punch upwardly through tab 17 of the ticket 15.

Tag-cutting mechanism

Figure 11:
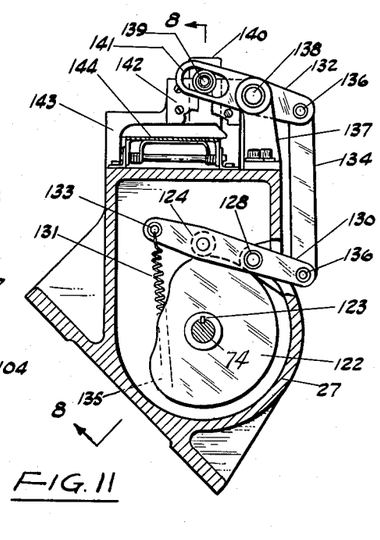
Fig. 11 is a cross-sectional view taken along line 11—11 of Fig. 8 showing the tag-cutting mechanism.

After the tab 17 has been punched upwardly, the tag is advanced to the cutting mechanism to be separated from the following tag, prior to engagement with the item to be tagged. The cutting mechanism is illustrated in Figs. 8 and 11. Cutting cam 122, affixed to main cam shaft 74 by means of key 123, engages cam follower 124 which in turn is affixed by means of pin 126 to a driving arm 130 supported by pin 128. Spring 131 insures constant contact between the cam follower and cam and extends from ring 133 on arm 130 to a fixed point 135 on housing 27.

Driving arm 130 is mechanically connected with follower arm 132 by means of tie bar 134 and pins 136. Following arm 132 is supported on pivot support shaft 138 mounted on housing extension 137 and connected to knife 140 by means of pin 139 which acts in slot 141 of following arm 132. The direction of travel of the knife in vertical motion is maintained by knife guides 142, and the stationary portion of the cutting device consists of permanently positioned anvil 143. In order to provide the necessary flexibility in the movement of tag 15 as the knife is moved downwardly to cut it along line 16 (Fig. 1), a pressure plate 144 is provided. This pressure plate 144 is held in its normal position and given the desired flexibility by means of pressure plate torsion spring 146. Spring 146 is maintained in position by means of pressure plate shaft pin 148.

As in the case of tab-punching mechanism, there is no movement of the knife during the advancing cycle of the tab-punching cam. Cutting begins (as shown in time cycle C of Fig. 16) when the tag has been advanced to a temporarily fixed position and is completed by the time the tab advancing pawl has rotated through 270°.

*Carriage mechanism*

Figures 12, 13:
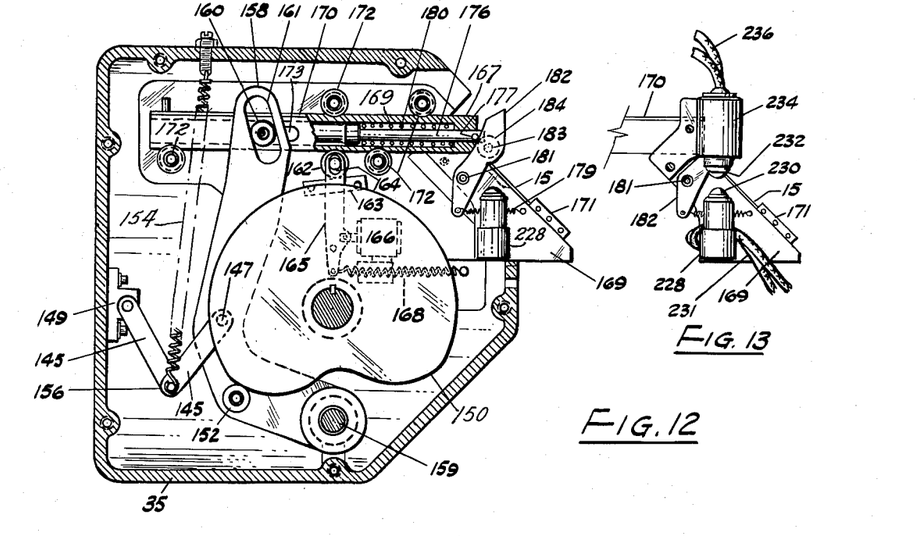
Fig. 12 is a cross-sectional view taken along line 12—12 of Fig. 8 showing the carriage driving mechanism.
Fig. 13 is a detailed side view of the sensing device which is part of the carriage mechanism.
Figure 14:
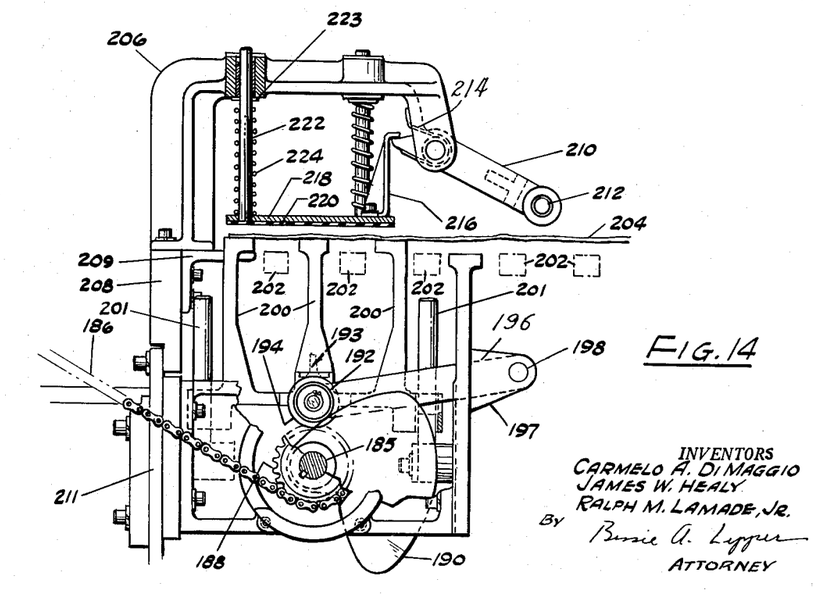
Fig. 14 is a view, part in cross-section and part in side plan, of the platform mechanism.

Three primary functions are combined in the carriage mechanism. These functions are (1) to determine whether or not the item to be tagged is properly in place, i.e., position in the limits set; (2) to move the tag into place to contact the item; and (3) to roll back the tab of the tag into place thus attaching the tag to the item. The carriage mechanism is illustrated in Figs. 8, 12 and 13.

Carriage control cam 150, mounted on main cam shaft 74, engages carriage control cam follower 152 rotatably mounted on follower arm 158. The position of follower arm 158 is maintained with respect to central housing 35 by means of support 157. Spring 154 is anchored to pin 156 located at the apex of two intersecting arms 145. The terminal ends of arms 145 are rotatably mounted, one to follower arm 158 by pin 147, the other to an extension 149 of central housing 35. This arrangement insures continuous contact between cam 150 and cam follower 152. Carriage driving roller 160 engages follower arm 158 and travels in slot 161 of arm 158 and slot 173 of carriage 170 (Fig. 4). In order to furnish a braking mechanism for the main carriage, the function of which is described below, brake roller 162, brake pad 163, brake arm 165, mechanically connected with brake roller 162 through slot 164, brake actuating solenoid 166, and brake arm spring 168 are provided.

Carriage 170, which is the mechanism by which the tag is moved forward to engage the item to be tagged and by which the tab of the tag is replaced to its original position, consists of cylinder 167 retained in position on suitable supports such as roller 172. Carriage 170 is equipped at its forward end with a tag support 169 which carries the tag forward at an angle to permit easy engagement with the item. Tag support 169 is equipped with a slidable tag holder 171 which is adjustable in an up and down direction to accommodate tags of various lengths.

Located inside cylinder 167 and concentric therewith is a tag actuating piston 176 around the forward portion of which is placed a tag actuating spring 180. The forward end of the actuating piston 176 has inserted in it a tab actuating pin 177 which is located at right angles to the direction of travel of the tab actuating piston 176. This tab actuating pin 177, during the forward motion of the carriage, strikes a tab actuator 182 which is moved in a forwardly and downwardly direction. Tab actuator 182 is rotatably mounted to tag support 169 by means of pin 181 and maintained in a normal upward position by spring 179. Attached to or integral with this tab actuator 182 is support pin 183 which supports a tab actuating roller 184. As the tab actuator moves forward and downward the roller 184 moves in a similar manner and rolls down the punched-out tab to force it back into position thus locking the tag onto the item as shown in Fig. 4.

The time cycle for the carriage control cam is illustrated as cycle D in Fig. 16. It will be seen from this cycle that the cam is so designed to move the carriage forward after the tag advancing pawl has passed through about 240°.

The braking mechanism provided on the carriage effects the stopping of the carriage itself after it has been moved out into the tagging position. However, the forward portion of the tab actuating piston is moved further forward to return the tab into place.

As pointed out above, one of the functions of the carriage mechanism is to determine whether or not the item to be tagged is in place within the limits established for the working of the mechanism. This function is performed by a photoelectric sensing device (Fig. 13) consisting of a light source 230 (such as a small electric light bulb) and electrical supply lines 231 in a housing 228, and a photoelectric cell 232 positioned in a cell housing 234. Suitable connections 236 lead out of housing 234 to be connected with brake actuating solenoid 166 (complete connection not shown).

Concurrently with the operation of the carriage mechanism of the apparatus the platform mechanism (described below) brings the item to be tagged into position and the sensing device, comprising the photocell arrangement described in detail above and shown in Fig. 13, determines whether or not the item to be tagged is in line in the limitation set by the apparatus. Normally, in the case of tagging the hem of a pair of nylon hose the top part of the hem may be aligned within limits amounting to about 5/8 of an inch. If the hem falls within these limits, light passing from light source 230 will be cut off from the photocell 232 thus breaking a circuit and actuating the solenoid 166 through connections 236. The solenoid then actuates the brake arm 165 pulling the brake roller 162 along brake pad 163 in a forwardly direction so that the brake roller 162 makes contact with the carriage 170. Once the contact is made and the brake roller has effectively wedged the carriage 170 into place, the self-energizing effect will lock the carriage. The balance of the travel of the carriage driven by the cam 150 forces the piston 176 forward beyond the stopping point of the carriage 170. The piston 176 in turn through actuating pin 177 strikes tab actuator 182, causes the roller 184 to move forward and down over the tab thus rolling it into place in the relationship indicated in Fig. 3.

Time cycle E of Fig. 16 shows that the carriage begins moving forward after the tab advancing pawl has rotated through approximately 210°. The platform which has brought up the item to be tagged is then maintained in position until the final functions of the carriage have been performed. The manner in which the platform brings the item to be tagged into position is discussed below.

*Platform mechanism*

The platform mechanism (shown in detail in Figs. 14 and 15) is that part of the apparatus which conveys the item to be tagged into position to receive the tag. If the item is one which is difficult to handle mechanically (such as a pair of nylon hose), the platform mechanism must also provide means for holding the item in place while the tag is being attached. Furthermore, the item must be delivered back to a conveying mechanism after being tagged in a straight condition for further processing, e.g., folding, etc.

The platform mechanism is coordinated with and driven by the same drive as the main cam shaft 74. This is accomplished by driving platform cam shaft 185 by chain 186 which engages sprocket 188 attached by key system 189 to shaft 185. Cam shaft 185 is mounted in chain housing 187 through bearing 217, bearing retainer 215 and collar 213. Platform cam shaft 185 and its housing 187 is extended (Fig. 15) to permit the sprocket 188 to be moved to the position indicated by the dotted lines, in order to properly line up the driving mechanism when the unit is shifted laterally to permit tags to be placed at various locations on the item.

Figure 15:
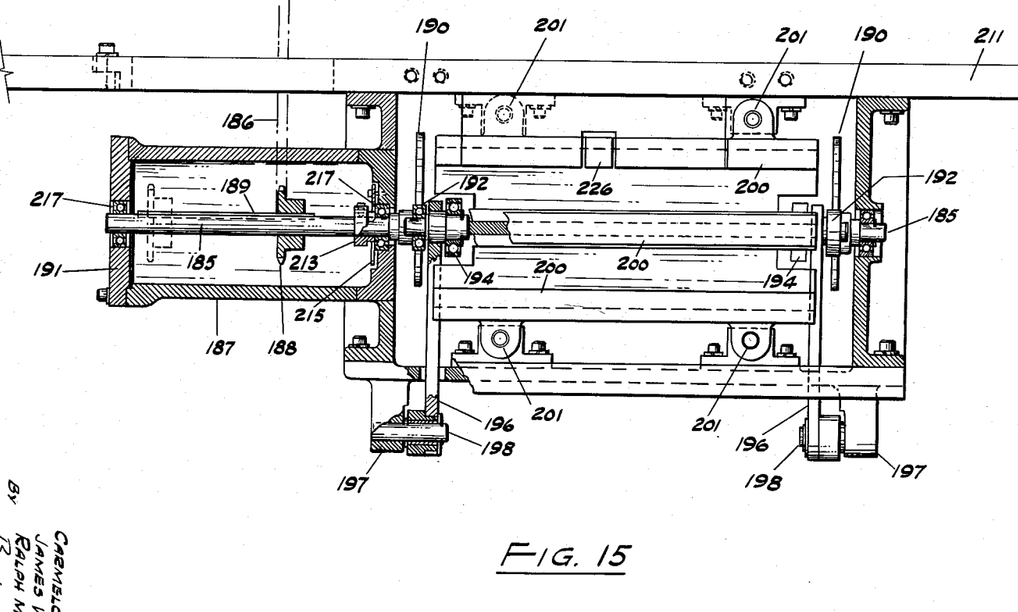
Fig. 15 is a top plan view, partially in cross-section, of the platform mechanism.
Figure 16:
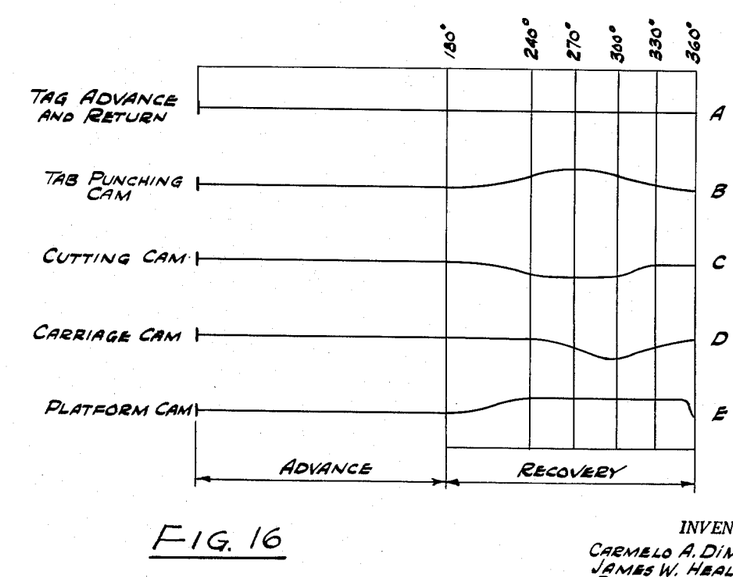
Fig. 16 is a diagrammatical representation of the time cycles of the cams driving the mechanisms of the apparatus of this invention.

Identical platform cams 190 are located at each end of platform shaft drive 185 (Fig. 15). Cam followers 192 are mechanically connected with platform actuating arms 196 through platform actuating rollers 194. If the platform mechanism is cast or made from a material such as aluminum, strikers 193 are provided to minimize the wear at those points where contact is made with the rollers 194. Actuating arms 196 are rotatably connected through pin 198 to main lower platform frame 197. Spring 219 (Fig. 3) is provided to return the platform to its lower position.

The actual platform on which the item is to be delivered to the tagging mechanism consists of spaced flanged platforms 200. The item to be tagged 204 is in turn delivered to the spaced flange platform 200 by an interdigitated conveyer means 202 which, after it has deposited the item, drops out of line leaving the item stretched across the flanged platform 200.

Cam 190 acting on actuating arm 196 through cam followers 192 and rollers 194 raises the flanged platforms 200 along guide bars 201 carrying item 204 to contact clamp 218 which is suspended from an upper frame 206 by means of clamp guides 222 which are free to move vertically through openings in the upper frame 206. Clamp guides 222 are furnished with collars 223 which engage springs 224 surrounding clamp guides 222 and offer the necessary flexibility in the movement of hem clamp 218. Hem clamp 218 in turn may be provided with a cushion 220 (a rubber strip for example) to protect the item which is to be clamped and tagged. The platform mechanism is affixed to the main apparatus frame 208 by means of a mounting plate 211. A guide 209 which determines the position of the item to be tagged is affixed to frame 208.

Attached to the upper frame 206 is an auxiliary clamp 210, the purpose of which is to maintain the lower portion of the item in a fixed position during the actual tagging operation. Thus in the case of handling a pair of nylon hose, the auxiliary clamp 210 presses down against the hose several inches below the hem edge and serves to hold the hose in a straight alignment, so that when the conveyer means 202 removes them from the platform mechanism after they have been tagged, they are still in perfect alignment for further processing. Auxiliary clamp 210 is equipped at the terminal end with a clamp pad 212 and is affixed to upper frame 206 by means of a torsion spring 214 which in turn insures that a constant force is applied by clamp pad 212 due to the contacting of clamp 210 with the clamp control 216 which is affixed to hem clamp 218.

The cycle E of Fig. 16 shows that the platform mechanism is moved upwardly after the tab advancing pawl has rotated through approximately 210°. The platform and hence the item to be tagged is then maintained in position until the functions of the device have been performed at which time it falls back into its lower position to discharge the tagged item and receive another one to be tagged.

The operation of the apparatus of this invention may best be described by tracing the progress of a single tag through the various mechanisms to the point where the item (taken for purposes of illustration to be a pair of nylon hose) is tagged and returned to a conveying means to be sent on to another stage.

A string of tags 15a as shown in Fig. 2 is placed in position into the apparatus (Fig. 6) by unscrewing hand knob 46, removing fixed flange 38 and placing the tag roll so that the edges of the tags abut guide flange 24. Fixed flange 38 is then placed in position and hand knob 46 turned manually until it is permanently in place. Spring 28 permits movable flange 24 to slide downward to adjust for the length of the tag.

The string of tags 15a is then wrapped around idler roll 48 (Fig. 7) which has been moved inwardly by loosening adjusting pin 60 to permit idler roller to swing to the left. The terminal tag of the string is inserted between upper platen 52 and lower platen 50 until the edge of the tag corresponding to slot 20 (Fig. 1) strikes the driving pawl 72. In order to make the insertion of this tag easy, lifting knob 68 is raised thus raising upper platen 52. After the tag has thus been located, lifting knob 68 is released and idler roller 48 is moved back and permanently affixed to its rightmost position as shown in Fig. 7. At this point the automatic operation of the device is begun. Motor 41 in housing 43 drives main cam shaft 74 and simultaneously platform cam shaft 185 geared thereto through chain 186. During the first 180° revolution of left helical gear 94 (Fig. 8) driving pawl 72 moves forward in slot 102 driving with it the string of tags by reason of the engagement of the upper edge of the driving pawl with external slot 20 of the tag. At the end of two advance cycles of the driving pawl, the first tag of the string 15a is placed into position directly above the tab punch 112 (Figs. 8 and 10). After approximately 210° revolution of the left-hand helical gear 94, the tab punch is driven upwardly by cam 104 through cam follower 108 to force tab 17 of the tag upward and hence in a position to receive an item to be inserted therein. Spring 118 returns tab punch to its original position at a point equivalent to about 330° revolution of the tag advancing gear 94.

After the tab has been punched upward, the tag reaches the cutting mechanism on completion of 3 additional cycles of the advancing pawl forward by the process described above. The knife cam 122 (Figs. 8 and 11) act on cam follower 124 which raises the knife 140 by virtue of the mechanical connections through arms 134 and 132 as explained above. The knife remains in the raised position through approximately 210° advance of the tag advancing pawl (Fig. 16) and is then lowered to effect the cutting of the tag during the recovery of the tag advancing pawl through about 210 to 315°. Spring 131 assures that the cutting action of the knife is complete. In order that the knife cuts in the manner desired, the tag during the cutting step rests on pressure plate 144 which is maintained in a normal horizontal position by means of torsion spring 146. The pressure plate and torsion spring provide the desired flexibility to the movement of the knife as it contacts the tag at line 16 (see Fig. 1) from the string of tags 15a.

The cut tag is now in position on the tag support 169 and held in place by slidable tag holder 171 which is adjustable to accommodate various lengths of tags (Figs. 4 and 12). In this position the tag is ready to be moved forward by the carriage mechanism to engage the item to be tagged.

It is necessary now to consider the action of the platform mechanism, and to follow the movement of the item to be tagged to its proper position with relation to the tag now located on the tag support 169. It will be seen from Fig. 16 that the timing of the platform cams 190 is so designed that the platform is raised into position after the tag advancing pawl has moved through about 210° and remains in this raised position until the tag advancing pawl has moved through about 350° or almost until that time for another tag to be advanced.

As the spaced flange platforms 200 are moved upwardly (having deposited on them the item to be tagged) through the action of the arms 196 driven by cam follower 192 and roller 194, the hem clamp 220 contacts item 204 and by the mechanism described above, auxilary clamp 212 contacts a lower portion of item 204 to hold it in place. When the platform has been raised to its upper position, it has aligned the item so that the designated tag location falls in line in tagging area 226 (Fig. 15). The item is then in position to be tagged.

Simultaneously with the location of the item in its proper position, the sensing device determines whether or not the item is present and is located within the limits established on item guide 209. When the sensing device has established that the item is in position, the interposition of the item between the light source 230 and the photocell 232 breaks the circuit between the photocell and the solenoid 166 and in doing so, imparts a forward motion to the solenoid brake arm 165 and causes the brake roller 162 to make contact with the carriage cylinder 170. Once the contact is made, the self-energizing effect locks carriage 170 in place by a wedging action. The forward movement of carriage 170 is just sufficient to bring the tag resting on support 169 with its tab up into contact with the edge of the item to be tagged.

The balance of the travel of the carriage by virtue of the cam design forces the tab actuating piston 176 forward so that the tab actuating pin 177 strikes tab actuator 182 moving it forward and downward and with it tab actuating roller 184 to roll tab 17 of the tag into position to lock the tag onto the edge of the item in the manner shown in Fig. 2. After the tab has been locked into position, the platform cam drops the platform back so that the tagged item may be picked up and removed and another put in its place while the platform mechanism remains in its lowest position. In the meantime the carriage has been returned to its original position within housing 35 to be in position to pick up another tag directly from the cutting mechanism. Thus the cycle is ready to begin again.

We claim:

1. Apparatus for automatically applying a tag with a displaceable tab to the edge of an item, comprising feeding means for supplying a string of connected tags, advancing means incorporating a forward and return cycle for intermittently advancing said tags during said forward cycle, punching means for displacing the tab of each of said tags, cutting means for separating each leading tag from said string of tags, carriage means for moving the separated tag forward beyond the position of said cutting means and comprising a housing member, an actuating element located and movable within said housing member, means for holding the cut and punched tag for engagement with said item, and means for moving said carriage; platform means for positioning the item to be tagged into tagging relationship with said tag before said tag has been moved forward, means associated with said carriage means for returning the displaced tab into its original position thus engaging the tag on to the edge of said item, said punching, cutting, and carriage means being so positioned and coordinated with relation to each other that they perform their functions concurrently on contiguous tags during the return cycle of said advancing means.

2. Apparatus in accordance with claim 1 including sensing means associated with said carriage means for determining the presence of said item within predetermined position limits on said platform means.

3. Apparatus in accordance with claim 1 wherein said feeding means comprises supply roller means equipped with a movable flange to accommodate tags of varying length.

4. Apparatus for automatically applying a tag with a displaceable tab to the edge of an item, comprising feeding means for supplying a string of tags, advancing means for intermittently advancing said tags, punching means for displacing the tab of each of said tags, cutting means for separating each leading tag from said string of tags, carriage means for moving the separated tag forward beyond the position of said cutting means and comprising an outside cylindrical member, an actuating piston located and movable within said cylindrical member, support roller means on which said carriage moves, means for holding the cut and punched tag for engagement with said item, and means for moving said carriage; platform means for positioning the item to be tagged into tagging relationship with said tag before it has been moved forward, means associated with said carriage means for returning the displaced tab into its original position thus engaging the tag on to the edge of said item, sensing means for determining the presence of said item within predetermined position limits on said platform means, and driving means incorporating advancing pawl means, punching cam means, cutting cam means, carriage cam means and platform cam means, said advancing pawl means incorporating a forward and a rearward motion, said punching cam, cutting cam and carriage cam means being positioned and coordinated with relation to each other and to said advancing pawl means so that they perform their functions concurrently on contiguous tags during the rearward motion of said advancing pawl means, and said platform cam means being actuated by said drive means to place said item to be tagged into position with relationship to said carriage means during the rearward motion of said advancing pawl means.

5. Apparatus in accordance with claim 4 wherein said cutting means comprises vertically movable knife means and a flexible pressure plate on which said tag rests during operation of said cutting means.

6. Apparatus for automatically applying a tag with a displaceable tab to the edge of an item, comprising feeding means for supplying a string of tags in a predetermined aligned condition, pawl means incorporating alternating forward and backward motion for engaging each consecutive tag from said string and imparting to said tag a forward motion through a predetermined distance during said forward motion of said pawl means, punching means for displacing the tab of each of said tags upwardly, cutting means for separating each leading tag from the succeeding tag, carriage means for moving the individual punched tag forward beyond the position of said cutting means and comprising an outside cylindrical member, an actuating piston located and movable within said cylindrical member, means for holding the cut and punched tag for engagement with said item and means for moving said carriage; platform means for effecting contact between the item to be tagged and the tag held on said carriage means, sensing means associated with said carriage means for determining the presence of said item within predetermined position limits on said platform means, roller means associated with said carriage means for returning the displaced tab into its original position to engage said item, and driving means associated with said pawl means, said punching means, said cutting means, said carriage means and said platform means, said punching, cutting and carriage means being actuated during the period of backward motion of said pawl means.

7. Apparatus in accordance with claim 6 further characterized by having solenoid braking means, electrically connected with said sensing means, which halt the forward movement of said carriage means at a predetermined point to allow said actuating piston to move beyond said predetermined point.

8. Apparatus for automatically applying a tag with a displaceable tab to the edge of an item, comprising feeding means for supplying a string of connected tags in a predetermined aligned condition, pawl means for imparting forward motion to said tags pivotally connected to a driving gear which imparts a forward motion to said pawl means during a first 180° of revolution and a rearward motion to said pawl means during a second 180° of revolution, punching means for temporarily displacing the tab of each of said tags from its normal position, cutting means for separating each leading tag from the succeeding tag, carriage means for moving the individual punched tag forward beyond the position of said cutting means and comprising an outside cylindrical member, an actuating piston located and movable within said cylindrical member, and support roller means on which said carriage moves, means for holding the cut and punched tag for engagement with said item, and means for moving said carriage; platform means for effecting contact between the item to be tagged and the tag held on said carriage means, roller means for returning the displaced tab to its original position to attach said tag to said item, and driving means for actuating said punching means, said cutting means, said carriage means, and said platform means during said second 180° of revolution of said driving gear.

9. Apparatus in accordance with claim 8 wherein said platform means comprises means for taking said item from a conveying device, and means for maintaining said item in a predetermined alignment before, during and after said tag is placed on the edge of said item.

References Cited in the file of this patent

UNITED STATES PATENTS

| | | |
|---|---|---|
| 1,970,769 | Raiche | Aug. 21, 1934 |
| 2,103,654 | Weimont et al. | Dec. 28, 1937 |